US012162323B2

(12) United States Patent
Jang

(10) Patent No.: US 12,162,323 B2
(45) Date of Patent: Dec. 10, 2024

(54) MOBILE ROBOT APPARATUS AND CONTROLLING METHOD THEREOF

(71) Applicant: SAMSUNG ELECTRONICS CO., LTD., Suwon-si (KR)

(72) Inventor: Junho Jang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/123,551

(22) Filed: Mar. 20, 2023

(65) Prior Publication Data

US 2023/0226870 A1 Jul. 20, 2023

Related U.S. Application Data

(63) Continuation of application No. PCT/KR2021/013508, filed on Oct. 1, 2021.

(30) Foreign Application Priority Data

Nov. 17, 2020 (KR) .......................... 10-2020-153552

(51) Int. Cl.
*B60G 17/017* (2006.01)
*B25J 5/00* (2006.01)
(Continued)

(52) U.S. Cl.
CPC .............. *B60G 17/017* (2013.01); *B25J 5/00* (2013.01); *B25J 5/007* (2013.01); *B25J 9/0009* (2013.01);
(Continued)

(58) Field of Classification Search
CPC ............ B60G 17/017; B60G 2500/326; B62D 63/02; B25J 5/00; B25J 11/00;
(Continued)

(56) References Cited

U.S. PATENT DOCUMENTS 3,313,365 A * 4/1967 Jackson ................. B62D 37/04
180/218
3,480,098 A * 11/1969 Ward, Jr. ............... B62D 49/08
180/41
(Continued)

FOREIGN PATENT DOCUMENTS

FR          2 820 985 A1    8/2002
JP        2017-205313 A     11/2017
(Continued)

OTHER PUBLICATIONS

Communication dated Feb. 2, 2024 issued by the European Patent Office in European Application No. 21894878.4.
(Continued)

*Primary Examiner* — Paul N Dickson
*Assistant Examiner* — Timothy Wilhelm
(74) *Attorney, Agent, or Firm* — Sughrue Mion, PLLC

(57) ABSTRACT

A mobile robot apparatus includes a main body, a first wheel on a first side surface of the main body, a second wheel on a second side surface of the main body, where the first wheel and the second wheel include side surfaces having a convex shape, a first driving device configured to rotate the first wheel and the second wheel, a second driving device configured to move the first wheel and the second wheel to a first position or a second position, and a processor configured to, based on determining that the mobile robot apparatus is inverted to one side, control the second driving device to move a ground-engaging wheel from among the first wheel and the second wheel from the second position to the first position.

20 Claims, 24 Drawing Sheets

(51) Int. Cl.
*B25J 9/00* (2006.01)
*B25J 9/10* (2006.01)
*B25J 9/12* (2006.01)
*B25J 9/16* (2006.01)
*B25J 11/00* (2006.01)
*B25J 19/02* (2006.01)
*B62D 63/02* (2006.01)

(52) U.S. Cl.
CPC ............... *B25J 9/102* (2013.01); *B25J 9/126* (2013.01); *B25J 9/161* (2013.01); *B25J 9/1633* (2013.01); *B25J 19/023* (2013.01); *B25J 11/00* (2013.01); *B60G 2500/326* (2013.01); *B62D 63/02* (2013.01)

(58) Field of Classification Search
CPC ............ B25J 5/007; B25J 9/009; B25J 9/102; B25J 9/126; B25J 9/161; B25J 9/1633; B25J 9/1666; B25J 9/1676; B25J 19/02; B25J 19/023; Y10S 901/01
See application file for complete search history.

(56) References Cited

U.S. PATENT DOCUMENTS

| | | | | |
|---|---|---|---|---|
| 4,974,863 A * | 12/1990 | Patin | | B62D 9/02 280/62 |
| 5,437,467 A * | 8/1995 | Patin | | B62K 5/05 280/6.154 |
| 6,536,073 B2 | 3/2003 | Uratani et al. | | |
| 7,468,592 B2 * | 12/2008 | Lim | | B25J 5/007 318/587 |
| 7,635,041 B2 * | 12/2009 | Adachi | | B60L 15/20 180/218 |
| 7,649,331 B2 * | 1/2010 | Hosoda | | B62D 57/024 901/1 |
| 7,677,345 B2 * | 3/2010 | Hosoda | | B62D 57/024 180/218 |
| 7,717,200 B2 * | 5/2010 | Kakinuma | | B62D 61/00 180/218 |
| 7,766,719 B2 | 8/2010 | Ishihara et al. | | |
| 7,823,676 B2 * | 11/2010 | Yamada | | G05D 1/0891 180/218 |
| 8,050,820 B2 * | 11/2011 | Yanaka | | B60W 40/11 180/41 |
| 8,123,237 B2 * | 2/2012 | Takemura | | F16M 3/00 280/47.23 |
| 8,151,912 B2 | 4/2012 | Koide et al. | | |
| 8,162,328 B2 * | 4/2012 | Horiguchi | | B62K 11/007 280/5.521 |
| 8,162,351 B2 * | 4/2012 | Lee | | B25J 13/081 280/755 |
| 8,170,780 B2 * | 5/2012 | Field | | B60N 2/06 180/21 |
| 8,298,039 B2 | 10/2012 | Liu | | |
| 8,442,661 B1 * | 5/2013 | Blackwell | | B25J 5/007 700/62 |
| 8,498,743 B2 | 7/2013 | Kwak et al. | | |
| 8,666,575 B2 * | 3/2014 | Kosaka | | B62K 11/007 701/124 |
| 8,684,123 B2 * | 4/2014 | Chen | | B62K 11/007 180/218 |
| 9,045,190 B2 * | 6/2015 | Chen | | A63C 17/0073 |
| 9,221,504 B2 * | 12/2015 | Rivard | | B62D 37/04 |
| 9,292,786 B2 * | 3/2016 | Nagarajan | | B62D 57/032 |
| 9,308,648 B2 * | 4/2016 | Perkins | | B62D 57/032 |
| 9,975,258 B2 * | 5/2018 | Wiley | | B25J 19/0054 |
| 9,989,970 B1 * | 6/2018 | Morey | | B62D 57/024 |
| 10,493,617 B1 | 12/2019 | Holson et al. | | |
| 10,589,426 B2 | 3/2020 | Kou et al. | | |
| 10,800,049 B2 * | 10/2020 | Neville | | B25J 3/04 |
| 10,802,508 B2 * | 10/2020 | Saunders | | B25J 13/089 |
| 10,870,359 B2 * | 12/2020 | Chen | | B60L 15/2036 |
| 11,077,566 B2 * | 8/2021 | Chernyak | | B25J 19/002 |
| 11,213,763 B2 * | 1/2022 | Hayashi | | B25J 9/163 |
| 11,408,498 B2 * | 8/2022 | Weiss | | B62K 11/007 |
| 11,422,565 B1 * | 8/2022 | Webster | | G05D 1/0088 |
| 11,501,794 B1 * | 11/2022 | Kim | | G10L 15/1815 |
| 11,613,325 B2 * | 3/2023 | Schnapp | | B60K 7/0007 180/220 |
| 11,623,341 B2 * | 4/2023 | Son | | B25J 9/1035 74/422 |
| 11,624,447 B2 * | 4/2023 | Potter | | G05D 1/021 137/625.35 |
| 11,839,972 B2 * | 12/2023 | Chung | | A61G 5/06 |
| 2001/0029641 A1 | 10/2001 | Uratani et al. | | |
| 2007/0132420 A1 | 6/2007 | Lim et al. | | |
| 2008/0147281 A1 * | 6/2008 | Ishii | | B62D 61/00 180/218 |
| 2009/0301798 A1 * | 12/2009 | Yang | | B62D 57/032 901/1 |
| 2010/0071984 A1 * | 3/2010 | Doi | | B62K 11/007 180/218 |
| 2010/0161116 A1 | 6/2010 | Kwak et al. | | |
| 2011/0106313 A1 * | 5/2011 | Lee | | B25J 5/007 700/259 |
| 2012/0185087 A1 * | 7/2012 | Kang | | B62D 57/024 901/1 |
| 2012/0199407 A1 * | 8/2012 | Morey | | B62D 55/06 901/1 |
| 2013/0105239 A1 * | 5/2013 | Fung | | H04N 7/142 180/218 |
| 2013/0257018 A1 | 10/2013 | Fung | | |
| 2013/0282237 A1 * | 10/2013 | Nakamura | | B62K 11/007 701/38 |
| 2017/0080558 A1 * | 3/2017 | Cann | | B60L 50/52 |
| 2018/0043952 A1 * | 2/2018 | Ellerman | | B60K 1/00 |
| 2018/0154273 A1 | 6/2018 | Kou et al. | | |
| 2018/0169865 A1 | 6/2018 | Kou et al. | | |
| 2020/0262053 A1 * | 8/2020 | Clerc | | B62D 61/00 |
| 2021/0146528 A1 * | 5/2021 | Son | | A61G 5/04 |
| 2023/0004173 A1 * | 1/2023 | Jo | | G05D 1/0891 |
| 2023/0028871 A1 * | 1/2023 | Noma | | A63H 33/005 |
| 2023/0098075 A1 * | 3/2023 | Koo | | B25J 9/126 700/258 |
| 2023/0176591 A1 * | 6/2023 | Lynn | | G05D 1/0223 701/38 |
| 2023/0271312 A1 * | 8/2023 | Kim | | B25J 9/1651 |
| 2024/0109613 A1 * | 4/2024 | Mannhart | | B62D 61/00 |

FOREIGN PATENT DOCUMENTS

| | | |
|---|---|---|
| JP | 2017-213112 A | 12/2017 |
| KR | 10-2001-0089835 A | 10/2001 |
| KR | 20-0381929 Y1 | 4/2005 |
| KR | 10-0702733 B1 | 4/2007 |
| KR | 10-0783134 B1 | 12/2007 |
| KR | 10-2009-0118818 A | 11/2009 |
| KR | 10-2011-0108103 A | 10/2011 |
| KR | 10-2011-0132745 A | 12/2011 |
| KR | 10-1493384 B1 | 2/2015 |
| KR | 10-2016-0015435 A | 2/2016 |
| KR | 10-2018-0083398 A | 7/2018 |
| KR | 10-2106303 B1 | 5/2020 |
| WO | 2017/208948 A1 | 12/2017 |

OTHER PUBLICATIONS

International Search Report (PCT/ISA/210) issued by the International Searching Authority on Jan. 5, 2022 in corresponding International Application No. PCT/KR2021/013508.
Written Opinion (PCT/ISA/237) issued by the International Searching Authority on Jan. 5, 2022 in corresponding International Application No. PCT/KR2021/013508.

* cited by examiner

MOBILE ROBOT APPARATUS AND CONTROLLING METHOD THEREOF

CROSS-REFERENCE TO RELATED APPLICATION(S)

This application is a bypass continuation of International Application No. PCT/KR2021/013508, filed on Oct. 1, 2021, in the Korean Intellectual Property Receiving Office, which is based on and claims priority to Korean Patent Application No. 10-2020-0153552, filed on Nov. 17, 2020, in the Korean Intellectual Property Office, the disclosures of which are incorporated herein by reference in their entireties.

BACKGROUND

1. Field

The disclosure relates to a mobile robot apparatus and a controlling method thereof.

2. Description of Related Art

A robot for a general home use as well as use in an industrial field requiring a specialized academic field or a large-scale labor force may be generalized according to the development of a robot technology. In addition, a two-wheeled robot may be capable of moving a position as well as a robot performing a function while the position is fixed.

In the related art, a two-wheeled robot is generally designed to have a high center of gravity for posture control, thereby having a high possibility of inversion. However, it may be difficult to recover the posture using a restoring force. In particular, when the two-wheeled robot is inverted in the lateral direction, a flat side surface of the wheel may be grounded, and thus it may be difficult to return to the original posture even when the center of gravity of the robot is moved.

SUMMARY

Provided is a mobile robot apparatus capable of returning to an original posture by moving a center of gravity when the mobile robot apparatus falls down in a lateral direction, and a control method thereof.

Additional aspects will be set forth in part in the description which follows and, in part, will be apparent from the description, or may be learned by practice of the presented embodiments.

According to an aspect of the disclosure, a mobile robot apparatus may include a main body, a first wheel on a first side surface of the main body, a second wheel on a second side surface of the main body, where the first wheel and the second wheel include side surfaces having a convex shape, a first driving device configured to rotate the first wheel and the second wheel, a second driving device configured to move the first wheel and the second wheel to a first position or a second position, and a processor configured to, based on determining that the mobile robot apparatus is inverted to one side, control the second driving device to move a ground-engaging wheel from among the first wheel and the second wheel from the second position to the first position, where at the first position, central axes of the first wheel and the second wheel are closer to a center of gravity of the main body than at the second position.

The processor may be further configured to, based on determining that the mobile robot apparatus is inverted to one side while the ground-engaging wheel is in the first position, control the second driving device to move the ground-engaging wheel from the first position to the second position and then back to the first position.

The processor may be further configured to control the second driving device to move the ground-engaging wheel from the second position to the first position more rapidly than when moving a wheel from the first position to the second position.

The processor may be further configured to, based on to the ground-engaging wheel moving from the second position to the first position, control the second driving device to move a wheel not contacting a ground to the second position.

The mobile robot apparatus may include a sensor configured to sense an inclination of the main body, where the processor may be further configured to determine whether the mobile robot apparatus is inverted to one side based on a signal received from the sensor indicating the inclination of the main body.

The mobile robot apparatus may include a camera configured to capture a surrounding environment of the mobile robot apparatus, where the processor may be further configured to, based on determining that the mobile robot apparatus is inverted to one side, control the first driving device to rotate the ground-engaging wheel, generate an obstacle map around the mobile robot apparatus based on an image captured by the camera, and control the first driving device and the second driving device to rotate the mobile robot apparatus in a direction not colliding with an obstacle identified based on the obstacle map, returning the mobile robot apparatus to an original posture.

The processor may be is further configured to, based on determining that the mobile robot apparatus is inverted to one side on an inclined surface, control the first driving device and the second driving device rotate the mobile robot apparatus in a downward inclined direction of the inclined surface, returning the mobile robot apparatus to an original posture.

The first driving device may include a first motor configured to provide a first driving force to the first wheel and a second motor configured to provide a second driving force to the second wheel.

The second driving device may include a first rack provided within the first wheel, a second rack provided within the second wheel, a first pinion engaged with the first rack, a second pinion engaged with the second rack, a third motor configured to rotate the first pinion, and a fourth motor configured to rotate the second pinion.

The first wheel may include a rotatable first wheel cover and a first intermediate member provided between the rotatable first wheel cover and the main body, the second wheel may include a rotatable second wheel cover and a second intermediate member provided between the rotatable second wheel cover and the main body, the first rack may be provided in the first intermediate member, and the second rack may be provided in the second intermediate member.

The mobile robot apparatus may include a guide rail provided on at least one of the first intermediate member and the second intermediate member, where the main body includes a block configured to move along the guide rail on a side surface.

According to an aspect of the disclosure, a method of controlling a mobile robot apparatus including a first wheel and a second wheel on both sides of a main body may include determining whether the mobile robot apparatus is inverted to one side, and moving a ground-engaging wheel from among the first wheel and the second wheel from a second position to a first position, where at the first position, central axes of the first wheel and the second wheel are closer to a center of gravity of the main body than at the second position.

The determining whether the mobile robot apparatus is inverted to one side may be performed while the ground-engaging wheel is in the first position, and the moving the ground-engaging wheel may include moving to the ground-engaging wheel back the first position.

The ground-engaging wheel may be moved from the second position to the first position more rapidly than when being moved from the first position to the second position.

Moving the ground-engaging wheel may include, based on the ground-engaging wheel moving from the second position to the first position, moving a wheel not contacting a ground to the second position.

According to an aspect of the disclosure, a mobile robot apparatus may include a main body, a first wheel on a first side surface of the main body, a second wheel on a second side surface of the main body, and a processor configured to determine that the mobile robot apparatus is inverted to one side based on the first wheel being a ground-engaging wheel and the second wheel not contacting a ground, and based on determining that the mobile robot apparatus is inverted to one side, move the ground-engaging wheel from a second position to a first position, where at the first position, central axes of the first wheel and the second wheel are closer to a center of gravity of the main body than at the second position.

The processor may be further configured to, while the ground-engaging wheel is in the first position, move the ground-engaging wheel from the first position to the second position and then back to the first position.

The processor may be further configured to move the ground-engaging wheel from the second position to the first position more rapidly than when moving the ground-engaging wheel from the first position to the second position.

The processor may be further configured to, in response to the ground-engaging wheel moving from the second position to the first position, move the second wheel not contacting the ground to the second position.

The processor may be further configured to determine whether the mobile robot apparatus is inverted to one side based on a signal received from a sensor indicating an inclination of the main body.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
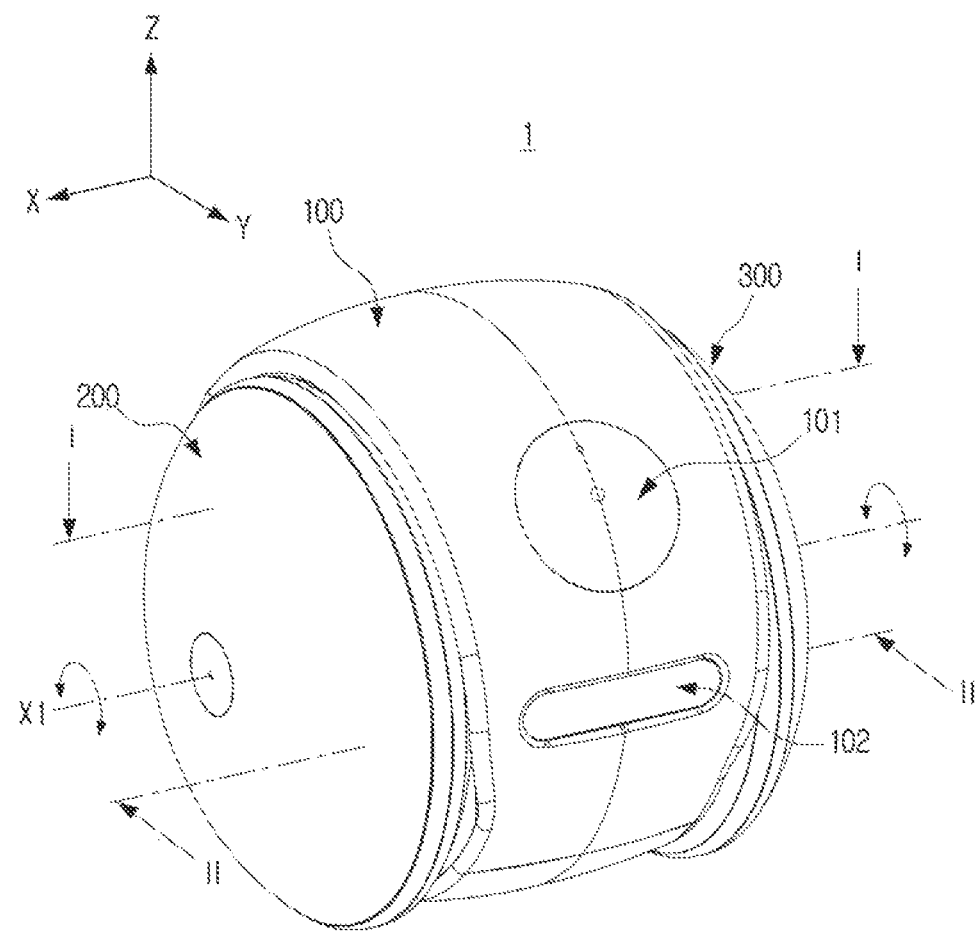
FIG. 1 is a diagram illustrating a mobile robot apparatus according to an embodiment of the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms used in the specification and the claims are general terms identified in consideration of the functions of the various embodiments of the disclosure. However, these terms may vary depending on intention, legal or technical interpretation, emergence of new technologies, etc.

It will also be understood that when an element is referred to as being "on" or "above" another element, the element may be in direct contact with the other element or other intervening elements may be present. The singular forms include the plural forms unless the context clearly indicates otherwise. It should be understood that, when a part "comprises" or "includes" an element, unless otherwise defined, other elements are not excluded from the part and the part may further include other elements.

Components for the description of each embodiment are described. However, the embodiments are not necessarily limited thereto. Accordingly, some components may be changed or omitted and other components may be added. In addition, components may be provided in different independent devices.

Furthermore, embodiments of the disclosure are described in detail with reference to the accompanying drawings and the contents described in the accompanying drawings, but the disclosure is not limited or limited by embodiments.

The use of any and all examples, or exemplary language (e.g., "such as") provided herein, is intended merely to better illuminate the disclosure and does not pose a limitation on the scope of the disclosure unless otherwise claimed.

Figure 2:
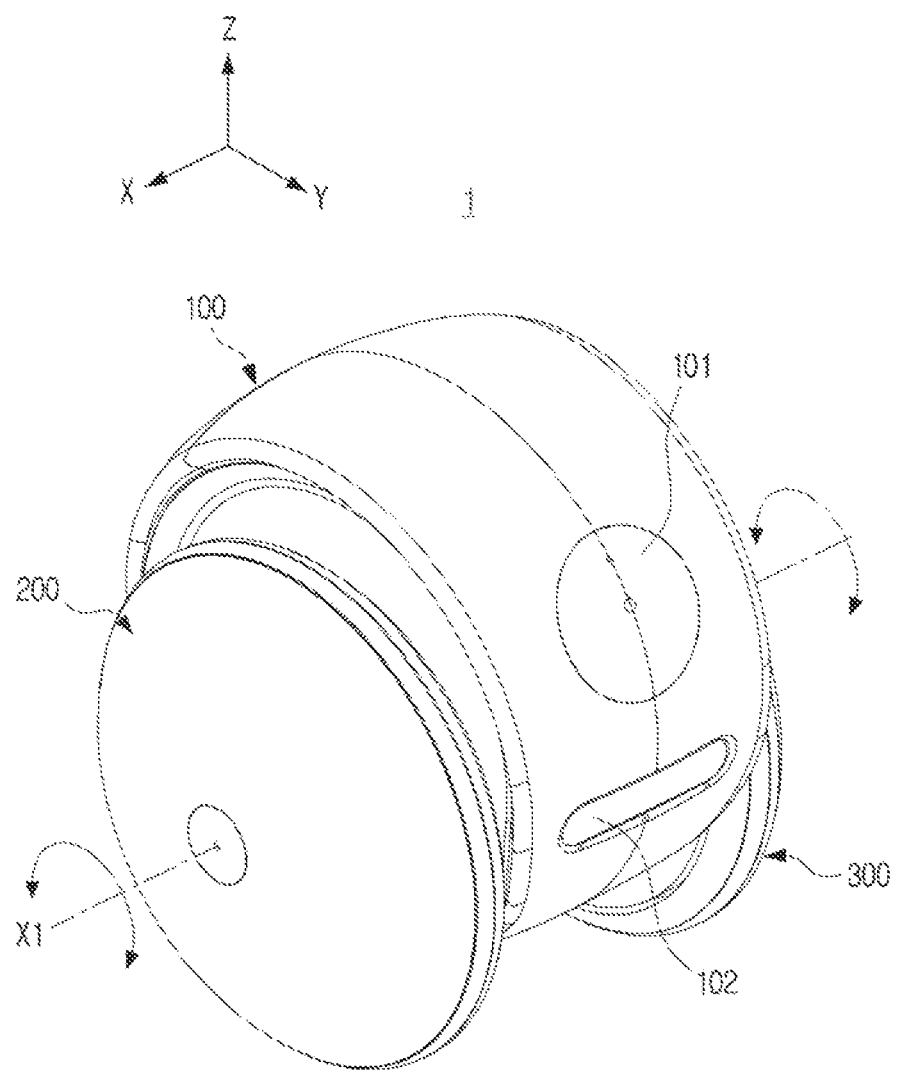
FIG. 2 is a diagram illustrating a state in which the main body of FIG. 1 rises according to an embodiment of the disclosure.
Figure 3:
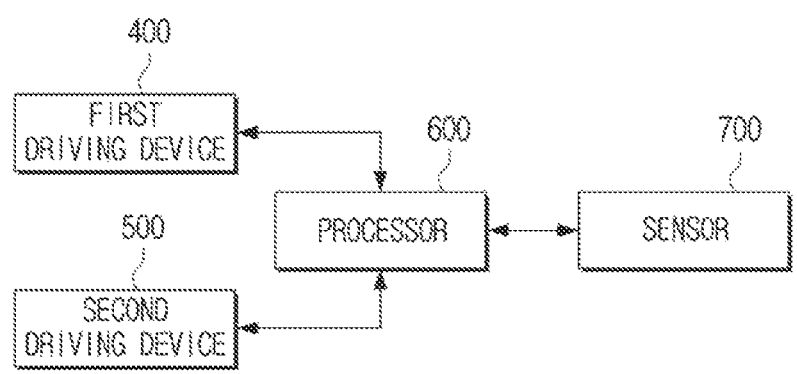
FIG. 3 is a diagram illustrating operation of a mobile robot apparatus according to an embodiment of the disclosure.

FIG. 1 is a diagram illustrating a mobile robot apparatus according to an embodiment of the disclosure. FIG. 2 is a diagram illustrating a state in which the main body of FIG. 1 rises according to an embodiment of the disclosure. FIG. 3 is a diagram illustrating operation of a mobile robot apparatus according to an embodiment of the disclosure.

A mobile robot apparatus 1 is a device having various functions such as recognizing a surrounding environment, enabling autonomous driving and information collection, transferring information to a user, etc. The mobile robot apparatus 1 may recognize a surrounding environment based on voice, sound, and image recognition. In addition, the mobile robot apparatus 1 may transmit information to a user by controlling another electronic product or outputting a voice through wireless communication.

The mobile robot apparatus 1 may collect and analyze various information such as sound, voice, and image in a surrounding environment, thereby enabling stable autonomous driving. For example, the mobile robot apparatus 1 may include a microphone, a camera, a sensor, etc., for collecting information about a surrounding environment.

The mobile robot apparatus 1 includes a driving member to enable physical movement, thereby enabling various functions of the mobile robot apparatus 1 to be executed throughout the environment of a user, including indoor environments and outdoor environments.

When the mobile robot apparatus 1 is used in an environment, functions may be executed and information may be collected by interacting with electronic products such as a television (TV), a cleaner, and a washing machine, and the collected information may be transmitted to other devices or other users within the environment. Accordingly, all users and electronic products may be connected.

The mobile robot apparatus 1 may continuously confirm and check an environment even when a user is absent, thereby connecting a user and another user (e.g., a user in the environment, a pet in the environment, etc.) who may require assistance. In addition, other appliances may be identified and manipulated through physical movement. Accordingly, the mobile robot apparatus 1 may promote safety and enhance security.

The mobile robot apparatus 1 according to an embodiment of the disclosure may be implemented in a form of performing a task in an indoor environment, such as a house, but is not limited thereto, and may be implemented as a robot device according to various embodiments.

Referring to FIGS. 1 to 3, the mobile robot apparatus 1 according to an embodiment of the disclosure may include a main body 100, a first wheel 200, a second wheel 300, a first driving device 400, a second driving device 500, a processor 600, and a sensor 700.

The main body 100 and the covers of the first wheel 200 and the second wheel 300 may have the same curvature, and thus the appearance of the mobile robot apparatus 1 may be formed to be spherical. Specifically, the side surfaces of the first and second wheels 200 and 300 may have a convex shape.

A motor, a battery, an actuator, a gear, a bearing, and the like, for driving the mobile robot apparatus 1 may be included in the main body 100 of the mobile robot apparatus 1.

A camera 101 for capturing the surrounding environment of the mobile robot apparatus 1 may be arranged on the outer surface of the main body 100. In addition, the main body 100 may include at least one sensor (e.g., sensor 700) therein. The sensor 700 may be at least one of an image sensor for detecting an obstacle, a sound sensor for sensing a voice, a temperature sensor capable of sensing a temperature, a humidity sensor for sensing humidity, and a tilt sensor for sensing the inclination of the main body 100.

Specifically, the sensor 700 for detecting the inclination of the main body 100 may sense which direction and which angle the main body 100 is inclined by detecting the direction of the gravitational acceleration, and the processor 600 may determine whether the mobile robot apparatus 1 is inverted.

The mobile robot apparatus 1 may recognize a surrounding environment based on information collected by the camera 101 disposed in the main body 100 and at least one sensor (e.g., sensor 700), enable autonomous driving and information collection, and transmit information to a user.

The first wheel 200 and the second wheel 300 may be disposed at both side surfaces of the main body 100, respectively.

The first driving device 400 may rotate the first and second wheels 200 and 300 with respect to the central axis Xl.

The mobile robot apparatus 1 may move forward or backward or move freely to a desired position by rotating as the first and second wheels 200 and 300 rotate around the central axis Xl.

The first and second wheels 200 and 300 may move while contacting the side surface of the main body 100 along both side surfaces of the main body 100, respectively. The first and second wheels 200 and 300 may vertically move relative to the main body 100.

The second driving device 500 may move the first and second wheels 200 and 300 to a first position or a second position, respectively. Specifically, the central axes of the first and second wheels 200 and 300 may be arranged closer to the center of gravity of the main body 100 at the first position than the second position.

For example, the first and second wheels 200 and 300 of FIG. 1 may be located at a first position, and the first and second wheels 200 and 300 of FIG. 2 may be located at a second position.

The first and second wheels 200 and 300 at the first position may cover all sides of the main body 100. The first and second wheels 200 and 300 in the second position may not cover the upper area of the side surface of the main body 100, and accordingly, the upper area of the side surface of the main body 100 may be exposed to the outside.

At the second position, the first and second wheels 200 and 300 may be disposed at lower with respect to the main body 100 than when the first and second wheels 200 and 300 are in the first position.

When the second driving device 500 moves the first and second wheels 200 and 300 from the first position to the second position, the lower surface of the first and second wheels 200 and 300 contacts the ground, and thus the main body 100 may move upward by reaction.

If the mobile robot apparatus 1 needs to perform high-speed driving or avoid an obstacle, the processor 600 may control the second driving device 500 such that the main body 100 moves upward with respect to the central axes of the first and second wheels 200 and 300.

The mobile robot apparatus 1 may include the processor 600 for controlling an operation of a mobile robot apparatus 1, a sensor (e.g., sensor 700) for recognizing a surrounding environment and a communication device for communicating with another electronic device.

The processor 600 may control an overall operation of the mobile robot apparatus 1. The processor may include one or more of a central processing unit (CPU), an application processor (AP), and a communication processor (CP). The processor may be a micro control unit (MCU).

The processor 600 may drive an operating system or an application program to control hardware or software components connected to the processor 600, and may process and compute a variety of data. In addition, the processor 600 may load a command or data received from at least one of the other components into a volatile memory, process the loaded command or data, and store various data in the non-volatile memory.

The processor 600 may receive surrounding environment information of the mobile robot apparatus 1 received from the camera 101 and at least one sensor (e.g., sensor 700), and control the first driving device 400 and the second driving device 500 based on the received information. The contents in which the processor 600 controls the first and second driving devices 400 and 500 will be described in detail later.

FIGS. 4A, 4B, 4C and 4D are diagrams illustrating a process in which the mobile robot apparatus of FIG. 2 has been inverted to one side and the posture is restored, according to an embodiment of the disclosure.

Figure 4A:
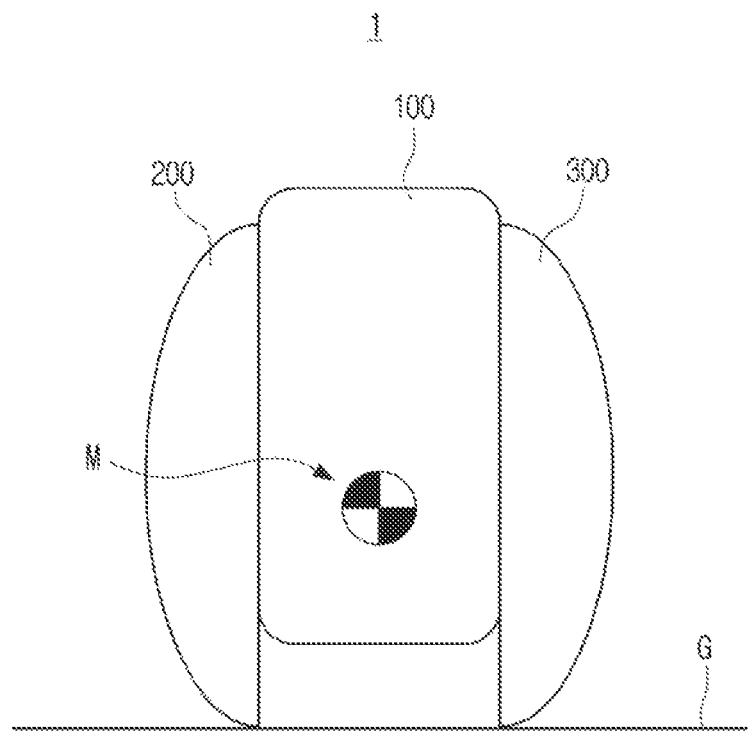
FIGS. 4A, 4B, 4C and 4D are diagrams illustrating a process in which the mobile robot apparatus of FIG. 2 has been inverted to one side and the posture is restored, according to an embodiment of the disclosure.
Figure 4B:
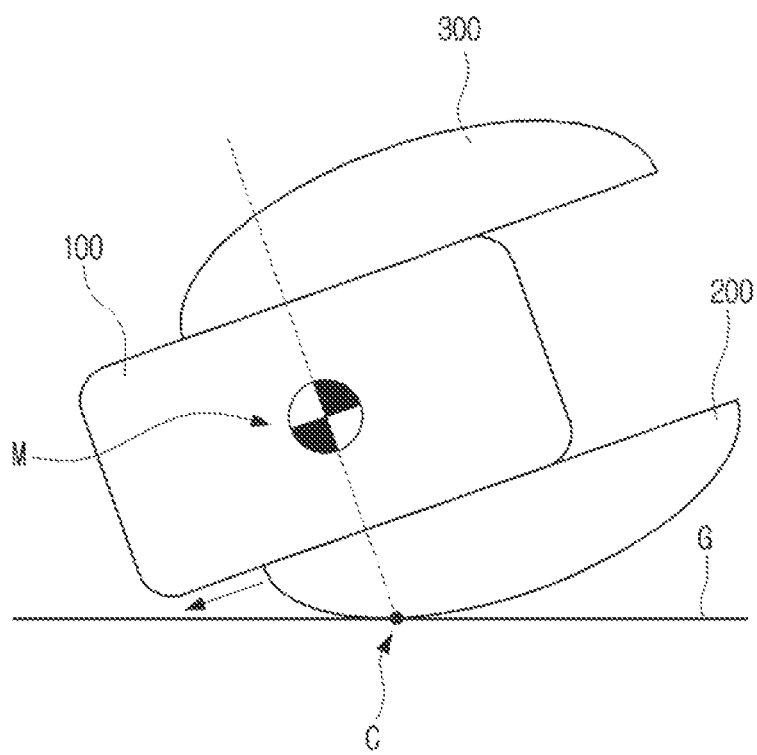

Referring to FIGS. 4A and 4B, the mobile robot apparatus 1 may be inverted to one side in a state in which the main body 100 moves upward. That is, both the first and second wheels 200 and 300 are in the second position.

The mobile robot apparatus 1 may be inverted to one side by colliding with the foot of a person, colliding with an animal, colliding with an obstacle during stopping or movement, etc.

Figure 4C:
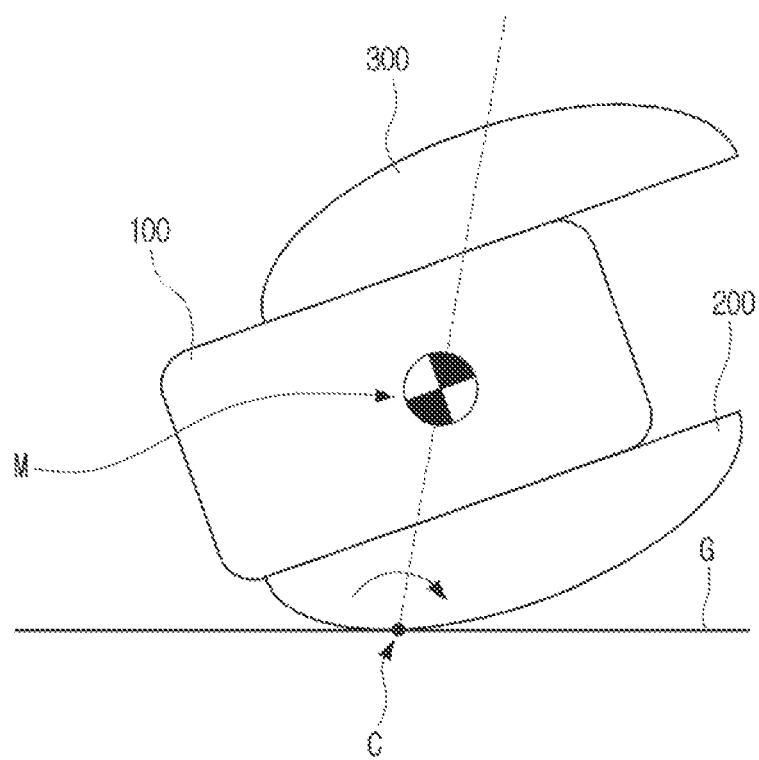

Referring to FIGS. 4B and 4C, when it is determined that the mobile robot apparatus 1 is inverted to one side, the processor 600 may control the second driving device 500 to move the ground-engaging wheel of the first and second wheels 200 and 300 from the second position to the first position. The ground-engaging wheel is a wheel contacting the ground G and the side surface, and may refer to the first wheel 200 in FIGS. 4B and 4C, but is not limited thereto, and the second wheel 300 according to the direction in which the wheel is inverted may be the ground-engaging wheel.

The central axes of the first and second wheels 200 and 300 may be closer to the center of gravity of the main body at the first position rather than the second position.

The processor 600 may determine whether the mobile robot apparatus 1 has been inverted to one side based on a signal received from the sensor 700 for detecting the inclination of the main body 100. However, the processor 600 may not only determine the inversion of the mobile robot apparatus 1 through the inclination of the main body 100, and may determine whether the mobile robot apparatus 1 is inverted through the pressure applied to the side surfaces of the first and second wheels 200 and 300 or the abnormal operation of the first and second driving devices 400 and 500.

When the second drive device 500 provides a driving force to the ground-engaging wheel to move the ground-engaging wheel from the second position to the first position, the ground-engaging wheel may be stationary in place by frictional force with the ground. The ground-engaging wheel may move from the second position to the first position as the main body 100 moves in the opposite direction of inversion relative to the ground-engaging wheel.

Accordingly, the center of gravity M of the mobile robot apparatus 1 moves from one side to the other side with respect to the ground point C of the ground-engaging wheel, and return torque may be applied to the mobile robot apparatus 1.

The side surfaces of the first and second wheels 200 and 300 of the mobile robot apparatus 1 have a convex shape such that the ground point C of the ground-engaging wheel is implemented to be narrow. Thus, the center of gravity M of the mobile robot apparatus 1 may more easily move from one side to the other side of the ground point C.

Also, the mobile robot apparatus 1 which rotates as the return torque acts may smoothly rotate as the convex grounding surface of the ground-engaging wheel minimizes friction with the ground.

That is, the mobile robot apparatus 1 may rotate in a direction opposite to inversion direction with respect to the ground point C at an angular velocity by return torque.

Also, after the ground-engaging wheel has finished moving to the first position, the mobile robot apparatus 1 may continue to rotate along the same direction by rotational inertia.

The ground-engaging wheel may rapidly accelerate and decelerate while moving from the second position to the first position. Accordingly, the larger return torque may be generated as the center of gravity M moves faster from one side of the ground point C to the other side according to rapid acceleration of the ground-engaging wheel. The rotational inertia of the mobile robot apparatus 1 may be maximized after the movement of the ground-engaging wheel is stopped due to the rapid deceleration of the ground-engaging wheel.

Figure 4D:
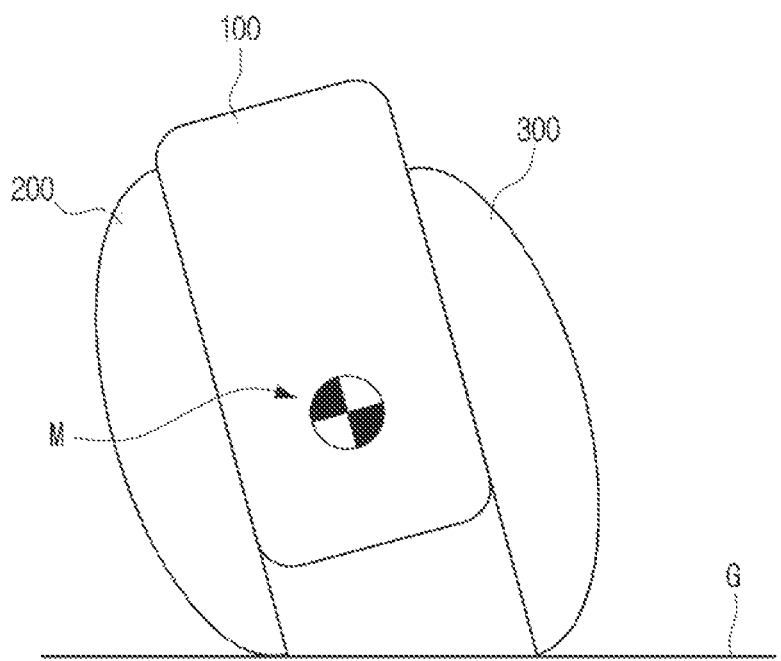

Referring to FIGS. 4C and 4D, the mobile robot apparatus 1 may easily return to an original position by way of the return torque acting by the center of gravity M around the ground point C and inertia.

FIGS. 5A, 5B, 5C, 5D and 5E are diagrams illustrating a process in which the mobile robot apparatus of FIG. 1 has been inverted to one side and then recovers a posture, according to an embodiment of the disclosure.

Figure 5A:
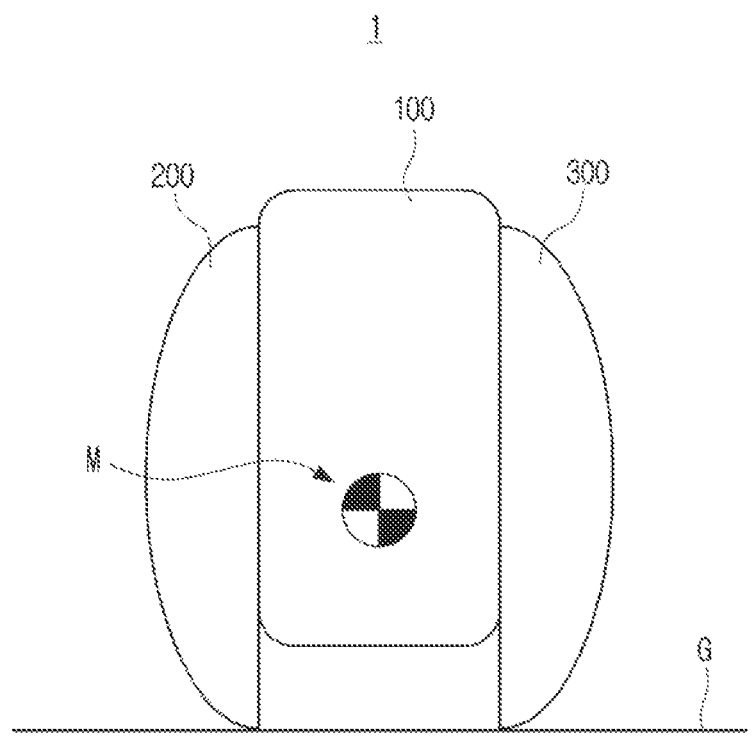
FIGS. 5A, 5B, 5C, 5D and 5E are diagrams illustrating a process in which the mobile robot apparatus of FIG. 1 has been inverted to one side and then recovers a posture, according to an embodiment of the disclosure.
Figure 5B:
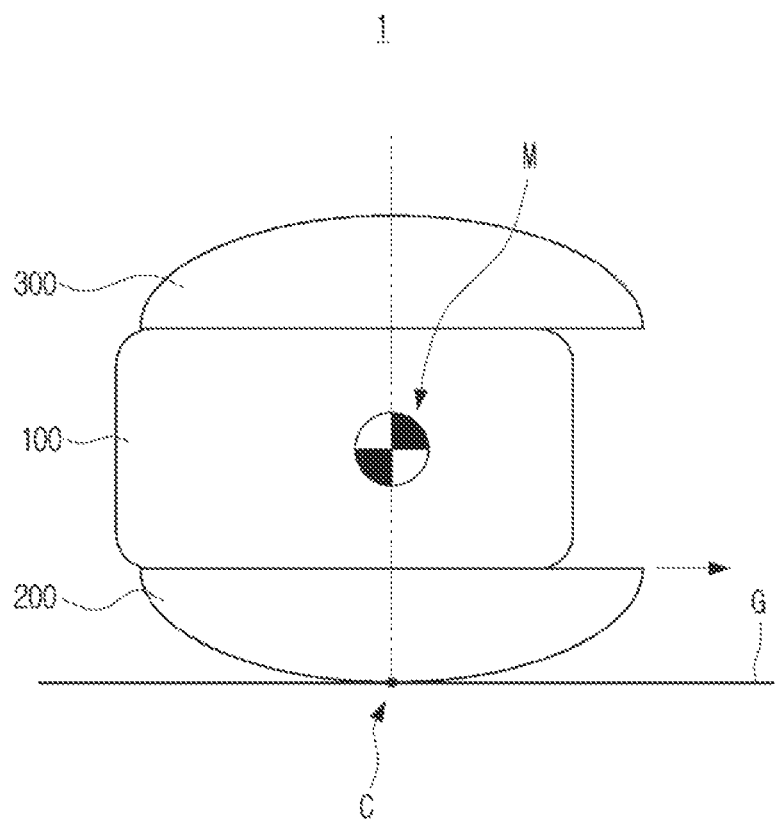

Referring to FIGS. 5A and 5B, the mobile robot apparatus 1 may be inverted to one side in a state in which the main body 100 moves downward. That is, both the first and second wheels 200 and 300 are in the first position.

Figure 5C:
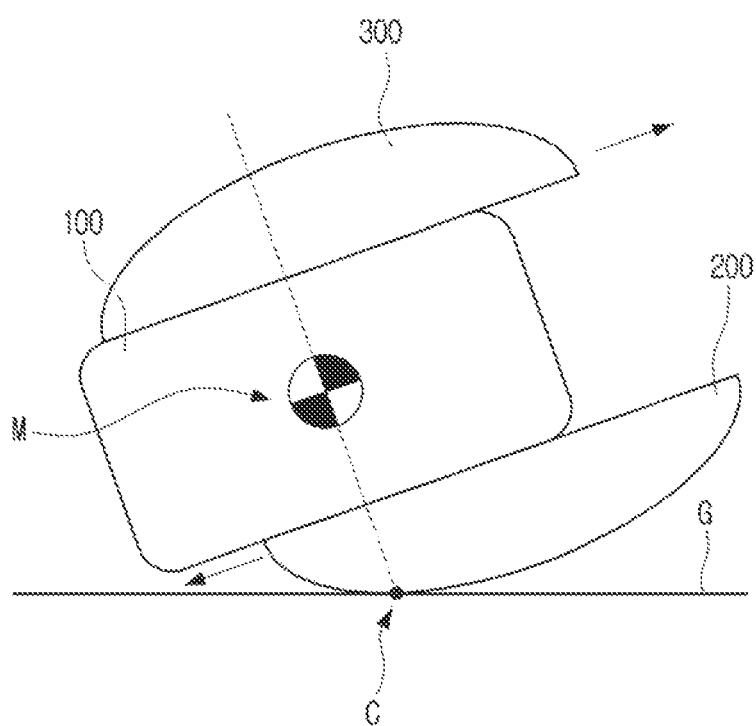
Figure 5D:
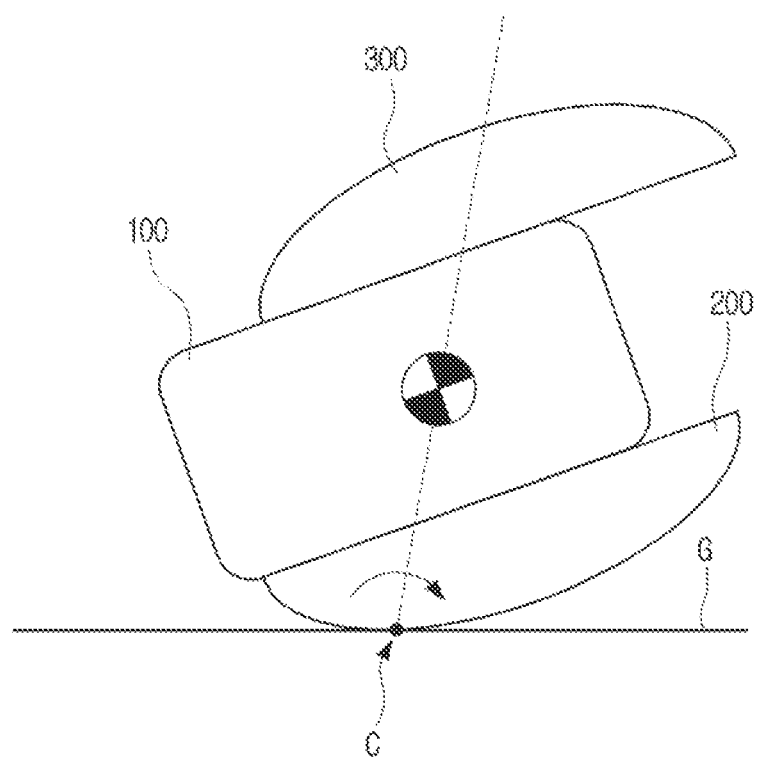

Referring to FIGS. 5B to 5D, when it is determined that the mobile robot apparatus 1 is inverted to one side in a state in which the ground-engaging wheel is in a first position, the processor 600 may control the second driving device 500 to move the ground-engaging wheel from the first position to the second position and then move back to the first position.

For example, when the ground-engaging wheel moves from the first position to the second position, the center of gravity M of the mobile robot apparatus 1 may further move in the inversion direction. Then, when the ground-engaging wheel moves to the first position again, the center of gravity M of the mobile robot apparatus 1 may be accelerated at a high speed along a sufficiently long section (i.e., the mobile robot apparatus 1 may shift the center of gravity M quickly), such that the mobile robot apparatus 1 may rotate by a larger return torque.

In addition, the processor may control the second driving device such that, when the ground-engaging wheel moves from the second position to the first position, the wheel, among the first and second wheels, not contacting the ground moves to the second position.

For example, the second wheel 300 that does not contact the ground may move to a second position. Accordingly, the center of gravity M of the entire mobile robot apparatus 1 rapidly moves in the opposite direction to the inversion, such that the mobile robot apparatus 1 may more easily return to the original position.

Also, since the mobile robot apparatus 1 returns to the original posture and the second wheel 300 moved to the second position comes into contact with the ground more quickly, the mobile robot apparatus 1 may more stably land on the ground.

The processor may control the second driving device 500 such that the ground-engaging wheel moves more rapidly from the second position to the first position than when moving from the first position to the second position.

Accordingly, the center of gravity M of the mobile robot apparatus 1 moves at a faster speed in the opposite direction of inversion, and thus the mobile robot apparatus 1 may more easily return to the original posture.

Figure 5E:
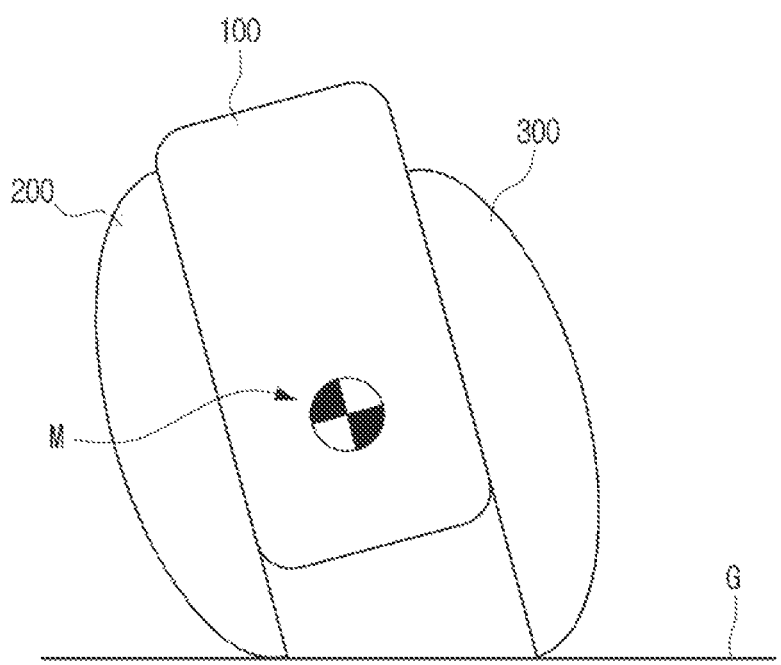

Referring to FIGS. 5D and 5E, the mobile robot apparatus 1 may easily return to an original position by way of inertia and a return torque acting by the center of gravity M around the ground point C.

FIGS. 6A, 6B, 6C and 6D are diagrams illustrating a process of recovering a posture by rotating a mobile robot apparatus in a direction in which the mobile robot apparatus does not collide with an obstacle, according to an embodiment of the disclosure.

Figure 6A:
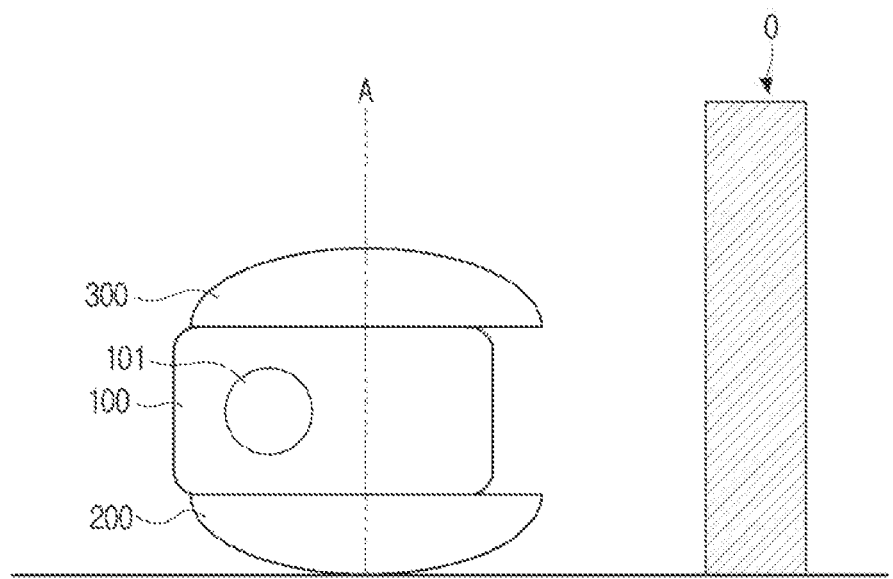
FIGS. 6A, 6B, 6C and 6D are diagrams illustrating a process of recovering a posture by rotating a mobile robot apparatus in a direction in which the mobile robot apparatus does not collide with an obstacle, according to an embodiment of the disclosure.
Figure 6B:
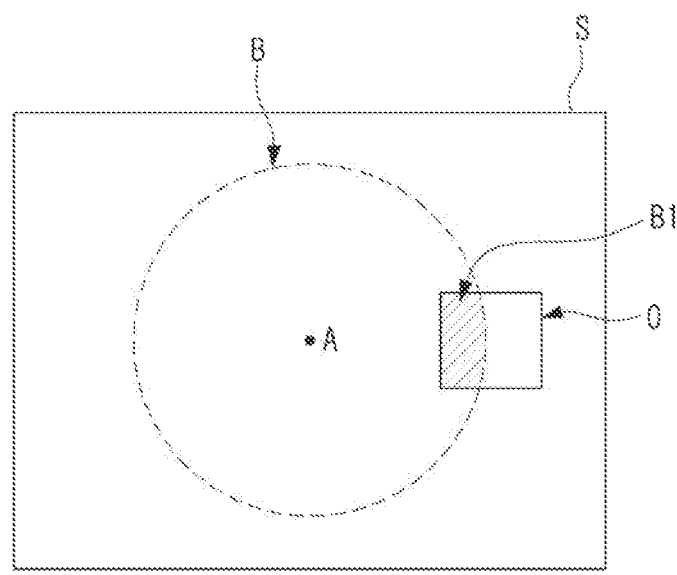

Referring to FIGS. 6A and 6B, when it is determined that the mobile robot apparatus 1 is inverted to one side, the processor 600 may control the first driving device 400 such that the ground-engaging wheel rotates by one round with respect to the A-axis, and generate a peripheral obstacle map S of the mobile robot apparatus 1 based on the image captured by the camera 101 while the ground-engaging wheel rotates.

For example, the processor 600 may compare the location of an obstacle O located on the right side of the mobile robot apparatus 1 and the return motion occupancy space B of the mobile robot apparatus 1. The processor 600 may control the first and second driving devices 400 and 500 to return to the original posture by rotating in a direction in which the mobile robot apparatus 1 does not collide with an obstacle O based on the obstacle map S when there is an area B1 in which the obstacle O and the return motion occupancy space B overlap.

Figure 6C:
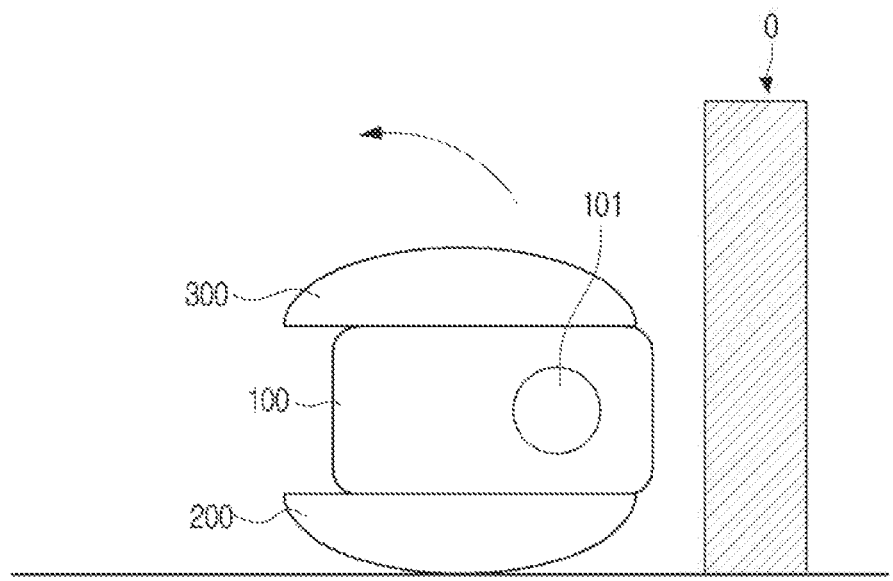
Figure 6D:
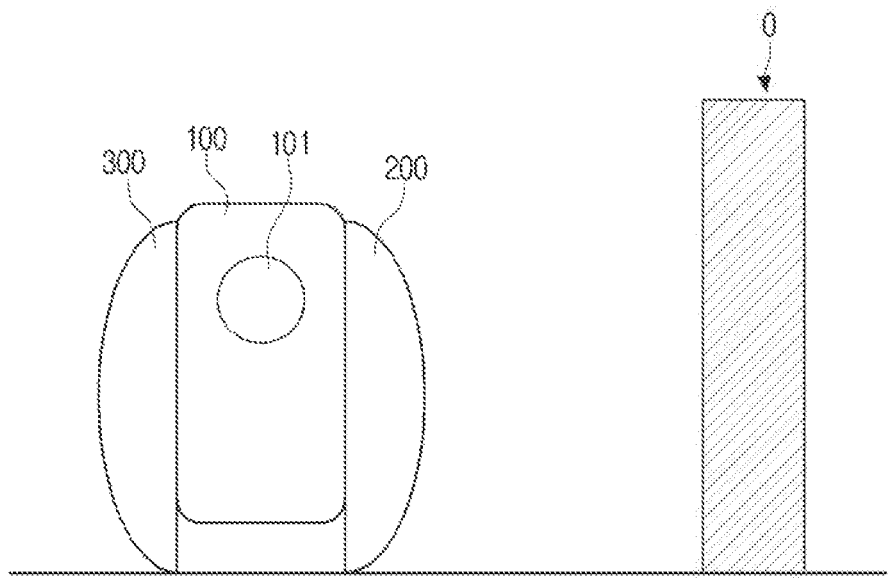

Referring to FIGS. 6C and 6D, the mobile robot apparatus 1 may perform the above-described return motion in a state in which the ground-engaging wheel is rotated 180 degrees from an initial state and does not collide with an obstacle O as much as possible.

That is, the mobile robot apparatus 1 inverted to one side may easily perform the above-described posture return motion while maximally avoiding a collision with a nearby obstacle.

Figure 7A:
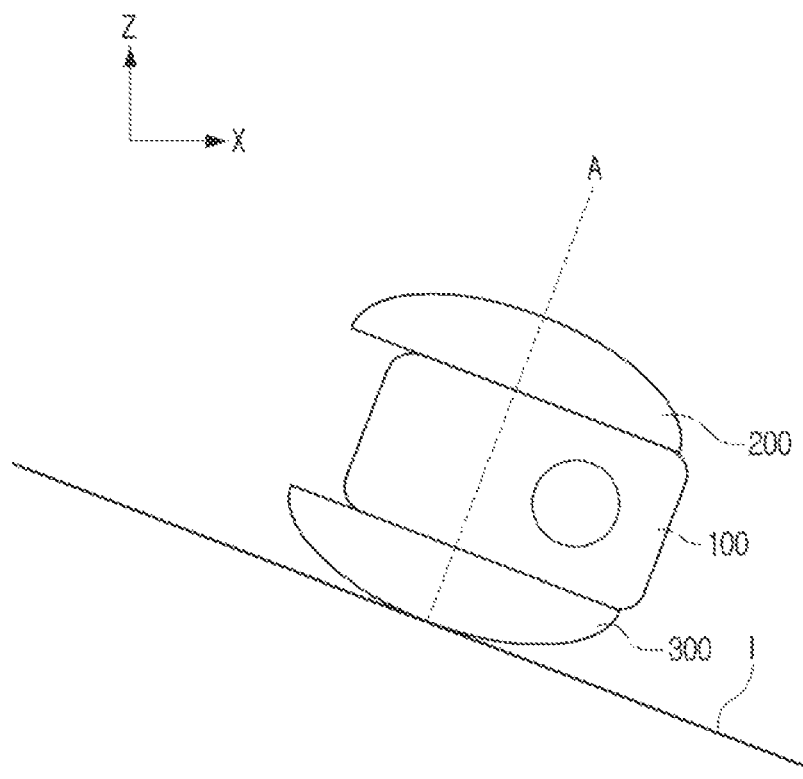
FIGS. 7A, 7B and 7C are diagrams illustrating a process of recovering a posture when a mobile robot apparatus is inverted on an inclined surface, according to an embodiment of the disclosure.
Figure 7B:
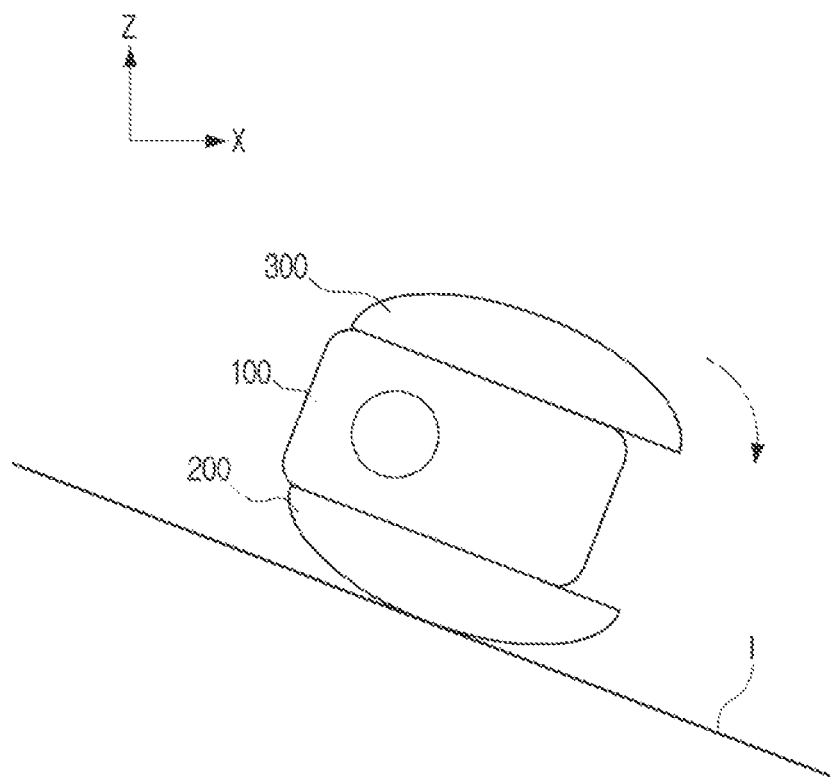
Figure 7C:
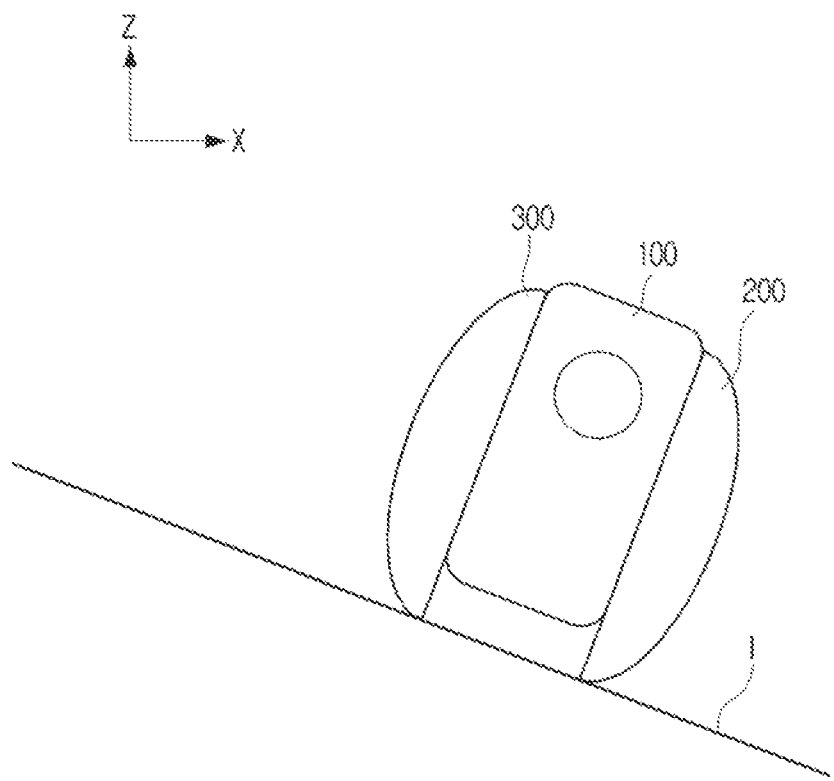

FIGS. 7A, 7B and 7C are diagrams illustrating a process of recovering a posture when a mobile robot apparatus is inverted on an inclined surface, according to an embodiment of the disclosure.

Referring to FIGS. 7A to 7C, when it is determined that the mobile robot apparatus 1 is inverted to one side from the inclined surface I, the processor 600 may control the first and second driving devices 400 and 500 such that the mobile robot apparatus 1 rotates in the downward inclined direction of the inclined surface I and returns to the original posture.

For example, referring to FIG. 7A, when a return motion is performed, the mobile robot apparatus 1 may not easily perform a return motion as the center of gravity may be moved upward against the gravity.

After the ground-engaging wheel rotates 180 degrees with respect to the A-axis, when the mobile robot apparatus 1 performs the return motion, the center of gravity moves to the lower side by way of gravity, and thus the return motion may be easily performed.

Figure 8:
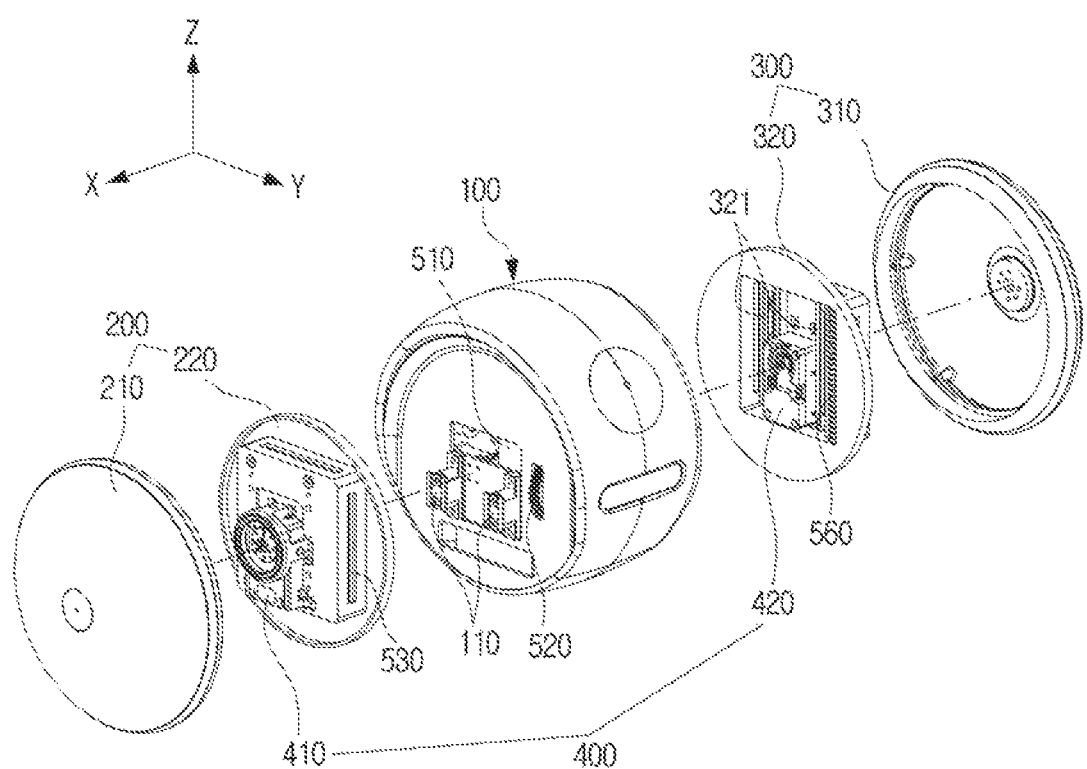
FIG. 8 is a diagram of a mobile robot apparatus according to an embodiment of the disclosure.
Figure 9:
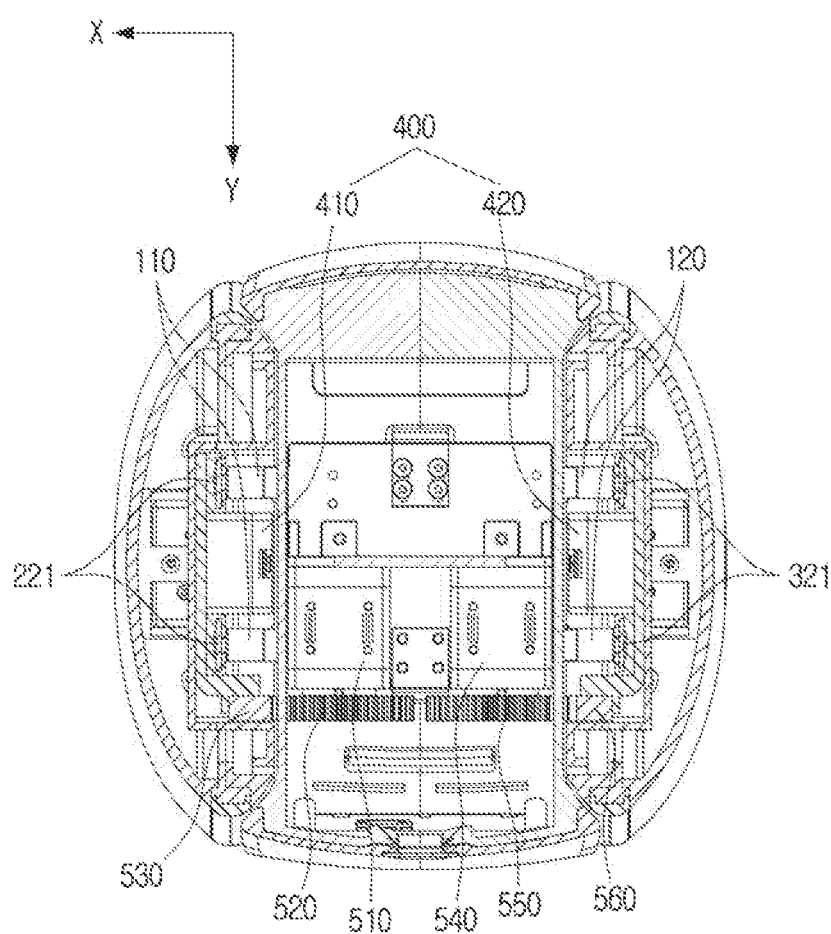
FIG. 9 is a cross-sectional view taken along line I-I of the mobile robot apparatus shown in FIG. 1, according to an embodiment of the disclosure.
Figure 10:
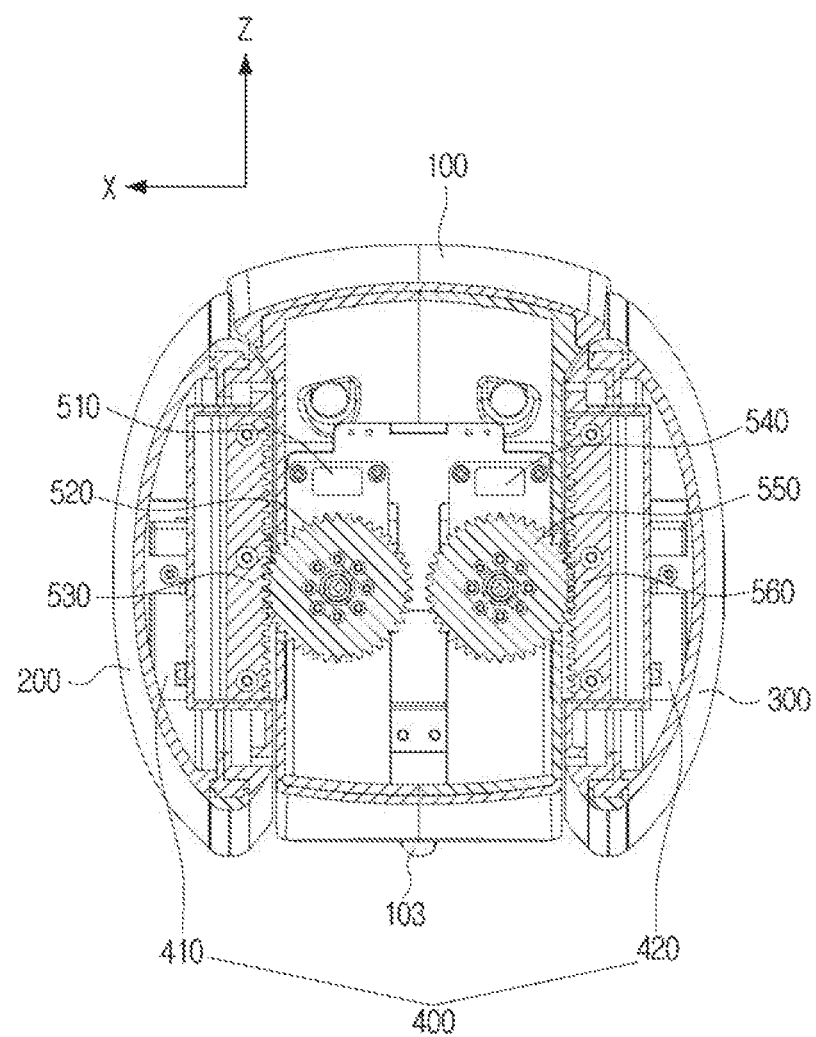
FIG. 10 is a cross-sectional view taken along line II-II of the mobile robot apparatus shown in FIG. 1, according to an embodiment of the disclosure.
Figure 11:
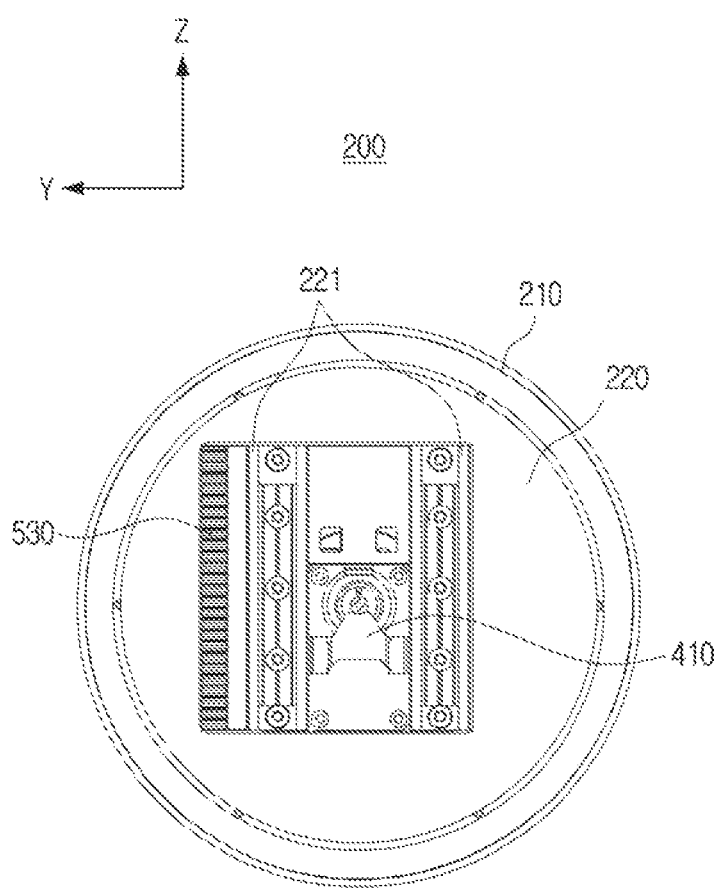
FIG. 11 is a diagram of a first wheel according to an embodiment of the disclosure.

FIG. 8 is a diagram of a mobile robot apparatus according to an embodiment of the disclosure. FIG. 9 is a cross-sectional view taken along line I-I of the mobile robot apparatus shown in FIG. 1, according to an embodiment of the disclosure. FIG. 10 is a cross-sectional view taken along line II-II of the mobile robot apparatus shown in FIG. 1, according to an embodiment of the disclosure. FIG. 11 is a diagram of a first wheel according to an embodiment of the disclosure.

Referring to FIGS. 8 to 11, the first wheel 200 may include a first wheel cover 210 and a first intermediate member 220, and the second wheel 300 may include a second wheel cover 310 and a second intermediate member 320.

The first driving device 400 may include a first motor 410 providing a driving force to the first wheel 200 and a second motor 420 providing a driving force to the second wheel 300.

Also, the second driving device 500 may include racks 530 and 560 arranged on at least one of the first and second wheels 200 and 300, respectively, pinions 520 and 550 arranged in the main body 100 so as to engage with the racks 530 and 560, respectively.

The first and second wheel covers 210 and 310 may be rotatably connected to first and second intermediate members 220 and 320 which do not rotate, respectively. In addition, both sides of the main body 100 may be connected to the first and second intermediate members 220 and 320 to be vertically movable.

That is, the first and second wheel covers 210 and 310 may rotate about the first and second intermediate members 220 and 320, respectively, and the main body 100 may move up and down with respect to the first and second intermediate members 220 and 320.

The first and second intermediate members 220 and 320 are arranged between the wheel covers 210 and 310, respectively, and the main body 100. The first and second intermediate members 220 and 320 may support the first driving device 400, the racks 530 and 560, and the guide rails 221 and 321.

The first motor 410 may be disposed in the first intermediate member 220 to rotate the first wheel cover 210, and the second motor 420 may be disposed on the second intermediate member 320 to rotate the second wheel cover 310.

The second driving device 500 may include a third motor 510, a first pinion 520, a first rack 530, a fourth motor 540, a second pinion 550, and a second rack 560.

The first pinion 520 may be arranged to be engaged with the first rack 530 in the main body 100, and the first rack 530 may be arranged in the first wheel 200.

When the third motor 510 rotates the first pinion 520, the first pinion 520 may move along the first rack 530. Accordingly, the main body 100 and the first wheel 200 may move relatively upward and downward.

The second pinion 550 may be arranged to be engaged with the second rack 560 in the main body 100, and the second rack 560 may be arranged in the second wheel 300.

When the fourth motor 540 rotates the second pinion 550, the second pinion 550 may move along the second rack 560.

Accordingly, the main body 100 and the second wheel 300 may move relatively upward and downward.

The first and second racks 530 and 560 may be arranged vertically. Accordingly, the main body 100 may move in a direction perpendicular to the ground relative to the first and second wheels 200 and 300.

Also, the first and second racks 530 and 560 may be arranged in the first and second intermediate members 220 and 320, respectively. Accordingly, since the first and second racks 530 and 560 maintain a constant shape regardless of the rotation of the first and second wheel covers 210 and 310, respectively, the main body 100 may stably move up and down relative to the first and second intermediate members 220 and 320.

As described above, since the second driving device includes two pairs of motors 510 and 540, pinions 520 and 550, and racks 530 and 560, the main body 100 may stably move upward and downward.

Also, the mobile robot apparatus 1 may further include guide rails 221 and 321 arranged on at least one of the first and second intermediate members 220 and 320, respectively, and the main body 100 may include first and second blocks 110 and 120 movable along the guide rails 221 and 321, respectively, on the side surface thereof.

The first guide rail 221 may be disposed on the first intermediate member 220, and the second guide rail 321 may be disposed on the second intermediate member 320. The first and second guide rails 221 and 321 may be vertically arranged.

The main body 100 may include a first block 110 movable along the first guide rail 221 on a side surface and a second block 120 movable along the second guide rail 321 on another side surface.

As the first and second blocks 110 and 120 of the main body 100 move by being coupled to the first and second guide rails 221 and 321, respectively, the main body 100 may move upward and downward relative to the first and second intermediate members 220 and 320, respectively. In addition, since the first and second guide rails 221 and 321 guide the moving path of the main body 100, the main body 100 may more stably move upward and downward.

Figure 12:
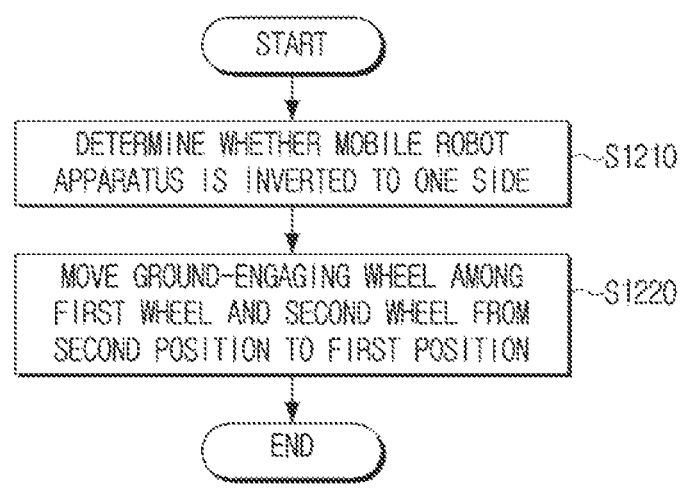
FIG. 12 is a flowchart illustrating a method for controlling a mobile robot apparatus according to an embodiment of the disclosure.

FIG. 12 is a flowchart illustrating a method for controlling a mobile robot apparatus according to an embodiment of the disclosure.

A method of controlling a mobile robot apparatus having a first wheel and a second wheel disposed on both sides of a main body includes determining whether the mobile robot apparatus is inverted to one side in operation S1210 and moving a ground-engaging wheel among the first wheel and the second wheel from a second position to a first position in operation S1220. The central axes of the first and second wheels may be closer to the center of gravity of the main body at the first position rather than the second position.

In operation S1210, the determining may include determining whether the mobile robot apparatus is inverted to one side while the ground-engaging wheel is in the first position, and the moving may include moving the ground-engaging wheel from the first position to the second position and then moving again to the first position.

In operation S1220, the ground-engaging wheel may move more rapidly from the second position to the first position than when moving from the first position to the second position.

In operation S1220, in response to the ground-engaging wheel moving from the second position to the first position, a wheel not contacting the ground among the first wheel and the second wheel may move to the second position.

The method of controlling the mobile robot apparatus may include, based on determining that the mobile robot apparatus is inverted to one side, rotating the ground-engaging wheel, and generating a nearby obstacle map around the mobile robot apparatus based on an image captured by the camera. The moving may include rotating the mobile robot apparatus in a direction not colliding with an obstacle based on the obstacle map and returning to an original posture.

In operation S1210, it may be determined that the mobile robot apparatus is inverted to one side on an inclined surface, and in operation S1220, the mobile robot apparatus may rotate in a downward inclined direction of the inclined surface to return to an original posture.

While embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure, and such modifications are within the scope of the disclosure.

What is claimed is:

1. A mobile robot apparatus comprising:
   a main body;
   a first wheel on a first side surface of the main body;
   a second wheel on a second side surface of the main body, wherein the first wheel and the second wheel comprise side surfaces having a convex shape;
   a first driving device configured to rotate the first wheel and the second wheel;
   a second driving device configured to move the first wheel and the second wheel to a first position or a second position; and
   a processor configured to, based on determining that the mobile robot apparatus is inverted to one side such that a side surface of a ground-engaging wheel among the first wheel and the second wheel having the convex shape contacts a ground, control the second driving device to move the ground-engaging wheel from the second position to the first position,
   wherein, at the first position, central axes of the first wheel and the second wheel are closer to a center of gravity of the main body than at the second position.

2. The mobile robot apparatus of claim 1, wherein the processor is further configured to, based on determining that the mobile robot apparatus is inverted to one side while the ground-engaging wheel is in the first position, control the second driving device to move the ground-engaging wheel from the first position to the second position and then back to the first position.

3. The mobile robot apparatus of claim 2, wherein the processor is further configured to control the second driving device to move the ground-engaging wheel from the second position to the first position more rapidly than when moving a wheel from the first position to the second position.

4. The mobile robot apparatus of claim 1, wherein the processor is further configured to, based on the ground-engaging wheel moving from the second position to the first position, control the second driving device to move a wheel not contacting the ground to the second position.

5. The mobile robot apparatus of claim 1, further comprising a sensor configured to sense an inclination of the main body,
   wherein the processor is further configured to determine whether the mobile robot apparatus is inverted to one side based on a signal received from the sensor indicating the inclination of the main body.

6. The mobile robot apparatus of claim 1, further comprising a camera configured to capture a surrounding environment of the mobile robot apparatus,
wherein the processor is further configured to, based on determining that the mobile robot apparatus is inverted to one side:
control the first driving device to rotate the ground-engaging wheel,
generate an obstacle map around the mobile robot apparatus based on an image captured by the camera, and
control the first driving device and the second driving device to rotate the mobile robot apparatus in a direction not colliding with an obstacle identified based on the obstacle map, returning the mobile robot apparatus to an original posture.

7. The mobile robot apparatus of claim 1, wherein the processor is further configured to, based on determining that the mobile robot apparatus is inverted to one side on an inclined surface, control the first driving device and the second driving device rotate the mobile robot apparatus in a downward inclined direction of the inclined surface, returning the mobile robot apparatus to an original posture.

8. The mobile robot apparatus of claim 1, wherein the first driving device comprises:
a first motor configured to provide a first driving force to the first wheel, and
a second motor configured to provide a second driving force to the second wheel.

9. The mobile robot apparatus of claim 1, wherein the second driving device comprises:
a first rack provided within the first wheel,
a second rack provided within the second wheel,
a first pinion engaged with the first rack,
a second pinion engaged with the second rack,
a third motor configured to rotate the first pinion, and
a fourth motor configured to rotate the second pinion.

10. The mobile robot apparatus of claim 9, wherein the first wheel comprises:
a rotatable first wheel cover, and
a first intermediate member provided between the rotatable first wheel cover and the main body,
wherein the second wheel comprises:
a rotatable second wheel cover, and
a second intermediate member provided between the rotatable second wheel cover and the main body,
wherein the first rack is provided in the first intermediate member, and
wherein the second rack is provided in the second intermediate member.

11. The mobile robot apparatus of claim 10, further comprising a guide rail provided on at least one of the first intermediate member and the second intermediate member,
wherein the main body comprises a block configured to move along the guide rail on a side surface.

12. A method of controlling a mobile robot apparatus that comprises a first wheel on a first side surface of a main body and a second wheel on a second side surface of the main body, the first wheel and the second wheel comprising side surfaces having a convex shape, the method comprising:
determining whether the mobile robot apparatus is inverted to one side based on a side surface of a ground-engaging wheel among the first wheel and the second wheel having the convex shape contacting a ground; and
moving the ground-engaging wheel from a second position to a first position,
wherein, at the first position, central axes of the first wheel and the second wheel are closer to a center of gravity of the main body than at the second position.

13. The method of claim 12, wherein determining whether the mobile robot apparatus is inverted to one side is performed while the ground-engaging wheel is in the first position, and
wherein the moving the ground-engaging wheel further comprises moving to the ground-engaging wheel back the first position.

14. The method of claim 13, wherein the ground-engaging wheel is moved from the second position to the first position more rapidly than when being moved from the first position to the second position.

15. The method of claim 12, wherein moving the ground-engaging wheel comprises, based on the ground-engaging wheel moving from the second position to the first position, moving a wheel not contacting the ground to the second position.

16. A mobile robot apparatus comprising:
a main body;
a first wheel on a first side surface of the main body;
a second wheel on a second side surface of the main body, wherein the first wheel and the second wheel comprise side surfaces having a convex shape; and
a processor configured to:
determine that the mobile robot apparatus is inverted to one side based on the first wheel being a ground-engaging wheel wherein the side surface having the convex shape contacts a ground and the second wheel not contacting the ground, and
based on determining that the mobile robot apparatus is inverted to one side, move the ground-engaging wheel from a second position to a first position,
wherein, at the first position, central axes of the first wheel and the second wheel are closer to a center of gravity of the main body than at the second position.

17. The mobile robot apparatus of claim 16, wherein the processor is further configured to, while the ground-engaging wheel is in the first position, move the ground-engaging wheel from the first position to the second position and then back to the first position.

18. The mobile robot apparatus of claim 17, wherein the processor is further configured to move the ground-engaging wheel from the second position to the first position more rapidly than when moving the ground-engaging wheel from the first position to the second position.

19. The mobile robot apparatus of claim 16, wherein the processor is further configured to, in response to the ground-engaging wheel moving from the second position to the first position, move the second wheel not contacting the ground to the second position.

20. The mobile robot apparatus of claim 16, wherein the processor is further configured to determine whether the mobile robot apparatus is inverted to one side based on a signal received from a sensor indicating an inclination of the main body.

* * * * *